(12) United States Patent
Kurahashi (10) Patent No.: US 10,277,780 B2
(45) Date of Patent: Apr. 30, 2019

(54) CLIENT DEVICE, SYSTEM, INFORMATION PROCESSING METHOD, AND RECORDING MEDIUM ADAPTED FOR CHANGING AN AUTHENTICATION MODE FROM AN INDIVIDUAL AUTHENTICATION MODE TO A COMMON AUTHENTICATION IN A CASE WHERE A TRANSMISSION OF AT LEAST FIRST OPERATION INFORMATION HAS FAILED DUE TO AN AUTHENTICATION ERROR

(71) Applicant: CANON KABUSHIKI KAISHA, Tokyo (JP)

(72) Inventor: Yuichi Kurahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/861,459

(22) Filed: Jan. 3, 2018

(65) Prior Publication Data

US 2018/0198956 A1 Jul. 12, 2018

(30) Foreign Application Priority Data

Jan. 6, 2017 (JP) .................................. 2017-001045

(51) Int. Cl.
| | | |
|---|---|---|
| G06F 21/00 | (2013.01) | |
| B42D 25/318 | (2014.01) | |
| B42D 25/29 | (2014.01) | |
| H04N 1/44 | (2006.01) | |
| H04N 1/32 | (2006.01) | |
| H04L 29/06 | (2006.01) | |

(52) U.S. Cl.
CPC ....... *H04N 1/4426* (2013.01); *H04L 63/0853* (2013.01); *H04N 1/32122* (2013.01); *H04N 1/4433* (2013.01); *H04L 67/42* (2013.01); *H04N 2201/0082* (2013.01); *H04N 2201/3202* (2013.01)

(58) Field of Classification Search
USPC ................................ 358/1.1–3.29, 1.11–1.18
See application file for complete search history.

(56) References Cited

U.S. PATENT DOCUMENTS

| | | | | |
|---|---|---|---|---|
| 2002/0019932 A1* | 2/2002 | Toh | ........................ | H04L 9/0894 713/155 |
| 2003/0188117 A1* | 10/2003 | Yoshino | .............. | G06F 21/6218 711/164 |
| 2005/0097332 A1* | 5/2005 | Imai | ........................ | G06F 21/33 713/176 |

(Continued)

FOREIGN PATENT DOCUMENTS

JP 201487010 A 5/2014

*Primary Examiner* — Marcellus Augustin
(74) *Attorney, Agent, or Firm* — Canon U.S.A., Inc. IP Division (57) ABSTRACT

There provided is a client device including a first change unit for changing authentication information from individual authentication information to common authentication information, which is authentication information commonly used by each client device, in a case where a transmission of first operation information is failed due to an authentication error, and a second transmission unit for transmitting second operation information to the server device by using the common authentication information changed by the first change unit.

9 Claims, 9 Drawing Sheets

(56) References Cited

U.S. PATENT DOCUMENTS

2010/0031316 A1* 2/2010 Taniguchi ............. H04L 9/3242
 726/3
2012/0268770 A1* 10/2012 Fukuda ................. G06F 21/608
 358/1.14
2017/0366581 A1* 12/2017 Ylonen ................. H04L 63/062

* cited by examiner

CLIENT DEVICE, SYSTEM, INFORMATION PROCESSING METHOD, AND RECORDING MEDIUM ADAPTED FOR CHANGING AN AUTHENTICATION MODE FROM AN INDIVIDUAL AUTHENTICATION MODE TO A COMMON AUTHENTICATION IN A CASE WHERE A TRANSMISSION OF AT LEAST FIRST OPERATION INFORMATION HAS FAILED DUE TO AN AUTHENTICATION ERROR

BACKGROUND

Field of the Disclosure

The present disclosure relates to a client device, a system, an information processing method, and a recording medium.

Description of the Related Art

With the spread of cloud services and Internet of Things (IoT), a device management system in which a management server receives and manages, via a network, operating information of an information processing apparatus such as an image forming apparatus including a communication control device has been introduced. In such a system, a plurality of information collecting clients for collecting operating information of the information processing apparatus and the management server are connected one another via a local area network (LAN), a wide area network (WAN), the Internet, or the like. The information collecting clients are provided in a customer network where the information processing apparatus, which is a target of the information collection, is provided. An information collecting application, which runs in the information collecting client, acquires the operating information of the information processing apparatus such as how many times a function has been used, a device status, and the like, and transmits the operating information to the management server periodically or occasionally. Further, to handle a case where a problem occurs during an operation by the information collecting application of the information collecting client, an operation log of the information collecting application is recorded and periodically transmitted to the management server. The management server is made to store and manage the operating information and operation log received from the information collecting client so that the operating information can be referred. In a case where there is a problem such that the operating information cannot be properly collected for example, the reason of the problem can be found by an operator by analyzing the operation log received by the management server.

In the information collected by the information collecting clients, there are many pieces of customer data which must be kept confidential as customer data such as a customer usage status, customer network information, customer personal information which is set in the information processing apparatus. Such customer data is divided based on tenants of each customer in view of information security and received operating information of the information processing apparatus is stored in a tenant area of each customer. The tenant area is divided for each customer and the stored customer data is protected by properly managing an access right to the tenant area. Here, in the communication between the information collecting client and management server, individual authentication information using an individual unique key is used so that other customers' data is not mixed accidentally.

Japanese Patent Laid-Open No. 2014-87010 discloses a technique that is made to reduce a risk of security in a case where a client device is connected to a management server, and communication with the management server is established based on individual authentication information after obtaining an individual unique key during the first access with an initial common key. By using the initial common key, which is installed in the client device in advance, communication by using the individual authentication information can be started without installing an individual unique key in the client device in advance.

SUMMARY

A client device according to the present disclosure includes a first transmission unit for transmitting first operation information to a server device by using individual authentication information, which is authentication information of each client device, a first change unit for changing the authentication information from the individual authentication information to common authentication information, which is authentication information commonly used by each client device, in a case where the transmission of the first operation information is failed due to an authentication error, and a second transmission unit for transmitting second operation information to the server device by using the common authentication information, which is changed by the first change unit.

Further features of the present disclosure will become apparent from the following description of exemplary embodiments (with reference to the attached drawings).

DESCRIPTION OF THE EMBODIMENTS

For transmission of operating information between an information collecting client and a management server, individual authentication information based on an individual unique key that uniquely identifies the information collecting client is used not to mix other customers' data accidentally. An operation log of an information collecting application is transmitted by using the individual authentication information, as in the case of the operating information, not to accept a reception from an information collecting client which is not validated. However, there may be a case that communication using the individual authentication information cannot be performed due to a problem. There may also be a case that communication using the individual authentication information cannot be established since the registration of the information collecting client is canceled in the management server. On the other hand, in a case where the communication using the individual authentication information becomes unavailable due to an error in the information collecting client side, the reason needs to be determined. However, once the communication using the individual authentication information becomes unavailable, the management server cannot receive the operation log, which is needed to determine the reason.

In the following, embodiments to achieve an object of the present disclosure will be described with reference the drawings.

Figure 1:
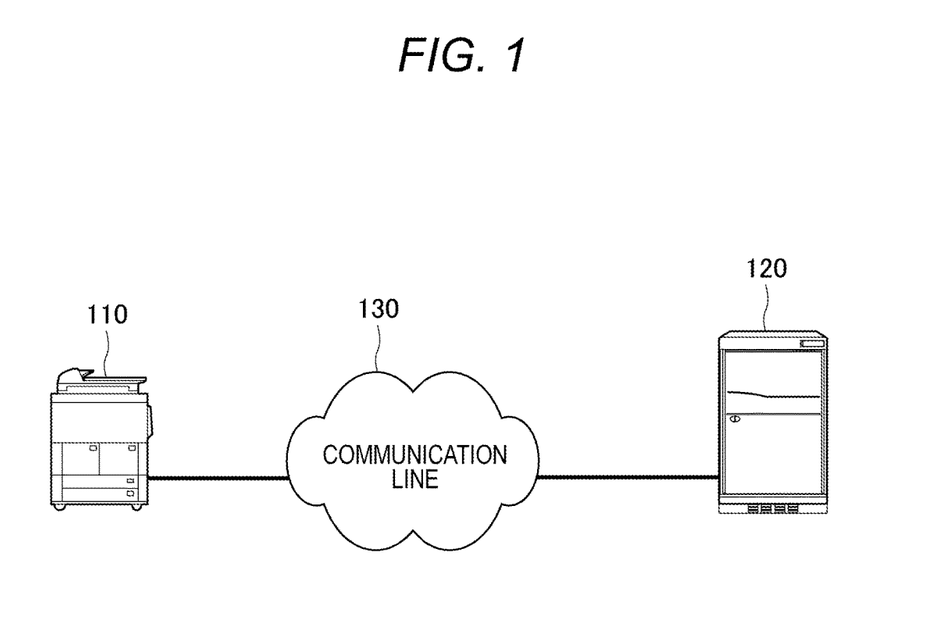
FIG. 1 is a diagram illustrating an example of a system configuration of an information processing system according to one or more aspects of the present disclosure.

FIG. 1 is a diagram illustrating an example of a system configuration of an information processing system. The information processing system includes an information collecting client 110, a management server 120, and a communication line 130. The information collecting client 110 is provided in customer's network environment to which an information processing apparatus such as an image forming apparatus is connected. An information collecting application that runs in the information collecting client 110 collects operating information of the information processing apparatus such as an image forming apparatus and transmits the collected operating information to the management server 120. The operating information of the information processing apparatus is information related to a usage status, by a customer user, of the information processing apparatus and includes how many times the information processing apparatus is used, its setting status, information identifying a user who has used the information processing apparatus, and the like. Further, to recognize a problem that occurs during the operation of the information collecting application, the information collecting application records a log related to the operation of the information collecting application and transmits the log, as an operation log, to the management server 120. The operation log is log information of each process in the information collecting application, and is used by a system administrator or the like to determine whether each process in the information collecting application is operated properly. The operation log includes an error history in the information collecting application, an operating information collecting process, an execution history of a communication process with the management server 120, a history of operation in the information collecting application, network setting information to communicate with the information processing apparatus and management server 120, and the like. The information collecting client 110 and the information processing apparatus such as an image forming apparatus are connected via a wide area network (WAN), a local area network (LAN), and the like. Or, as illustrated in FIG. 1, the information processing apparatus may include the information collecting application therein and operate as the information collecting client 110 integrated with the collecting-target information processing apparatus. The information collecting client 110 is connected to the external communication line 130 such as the Internet via a firewall or the like and transmits the operating information of the information processing apparatus and the operation log to the management server 120. The management server 120 receives the operating information of the information processing apparatus and the operation log from a plurality of information collecting clients 110, which are registered in advance. The management server 120 provides management service based on the accumulated operating information of the information processing apparatus. Further, there may be an operational problem, in the information collecting application running in the information collecting client 110, such that necessary operating information is not transmitted from the information collecting client 110. In such a case, in the management server 120, an operator analyzes the accumulated operation logs to recognize a reason such that any problem has occurred in the information collecting client 110 or the like and examine to solve the problem. The operation log is an example of operation information.

Figure 2A:
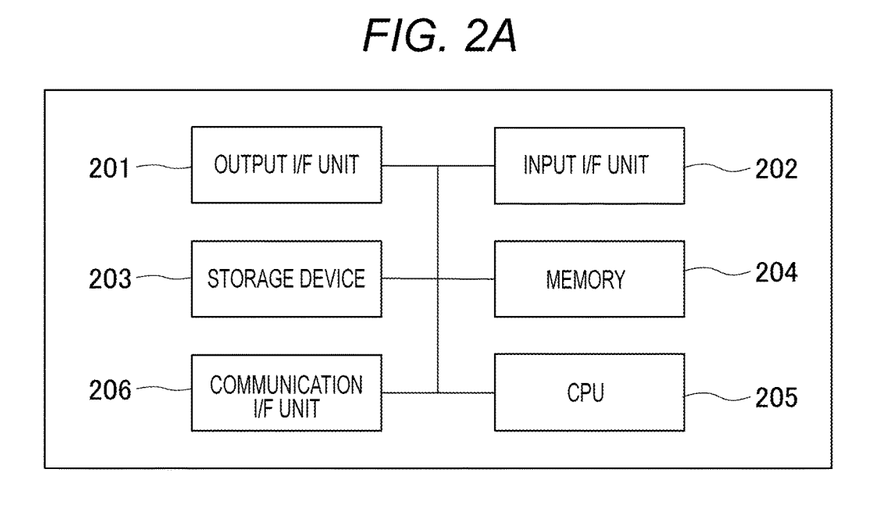
FIGS. 2A and 2B are diagrams illustrating an example of hardware configurations of each device according to one or more aspects of the present disclosure.

FIG. 2A is a diagram illustrating an example of a hardware configuration of the information collecting client 110. The information collecting client 110 includes an output I/F unit 201 connected to an output device such as a display, an input I/F unit 202 connected to an input device such as a keyboard, a storage device 203, a memory 204, a CPU 205, and a communication I/F unit 206. The storage device 203 stores a program of an operating system (OS), a program of the information collecting application for collecting operating information of the information processing apparatus and transmitting the operating information to the management server 120, and the like. The CPU 205 loads the program of the information collecting application and the like from the storage device 203 to the memory 204 and executes the program and the like. The communication I/F unit 206 is connected to the communication line 130 and controls communication with the information processing apparatus, which is a target of operating information collecting, and communication with the management server 120. When the CPU 205 executes a program based on the program stored in the storage device 203, the later described software configuration of the information collecting application of FIGS. 3A, 5 and 7A and processes of the flowcharts of FIGS. 4A, 6, and 8 are realized.

Figure 2B:
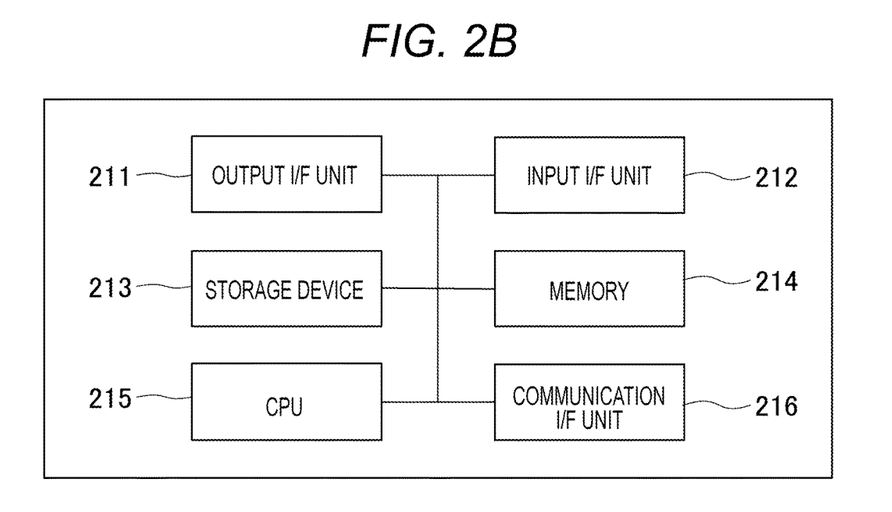

FIG. 2B illustrates an example of a hardware configuration of the management server 120. The management server 120 includes an output I/F unit 251 connected to an output device such as a display, an input I/F unit 252 connected to an input device such as a keyboard, a storage device 253, a memory 254, a CPU 255, and a communication I/F unit 256. The storage device 253 stores a program of an operating system (OS), a program of a management application that manages the connected information collecting client 110, the operating information, operation log, and the like received by the management application. The CPU 255 loads the program of the management application from the storage device 253 to the memory 254 and executes the program. The communication I/F unit 256 is connected to the communication line 130 and controls communication with the information collecting client 110. When the CPU 255 executes a process based on the program stored in the storage device 253, a later described software configuration of the management application of FIGS. 3B and 7B and processes of the flowchart in FIG. 4B are realized.

First Embodiment

Figure 3A:
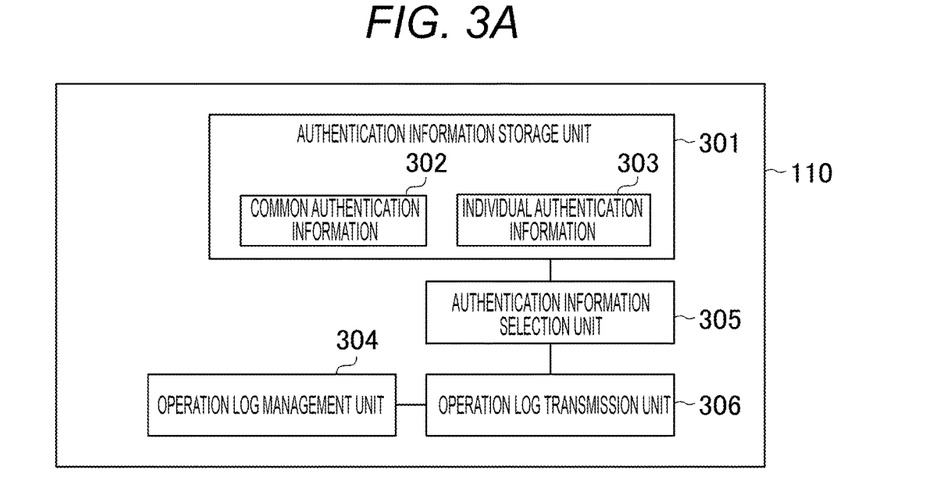
FIGS. 3A and 3B are diagrams illustrating an example of software configurations of each device according to one or more aspects of the present disclosure.
Figure 4A:
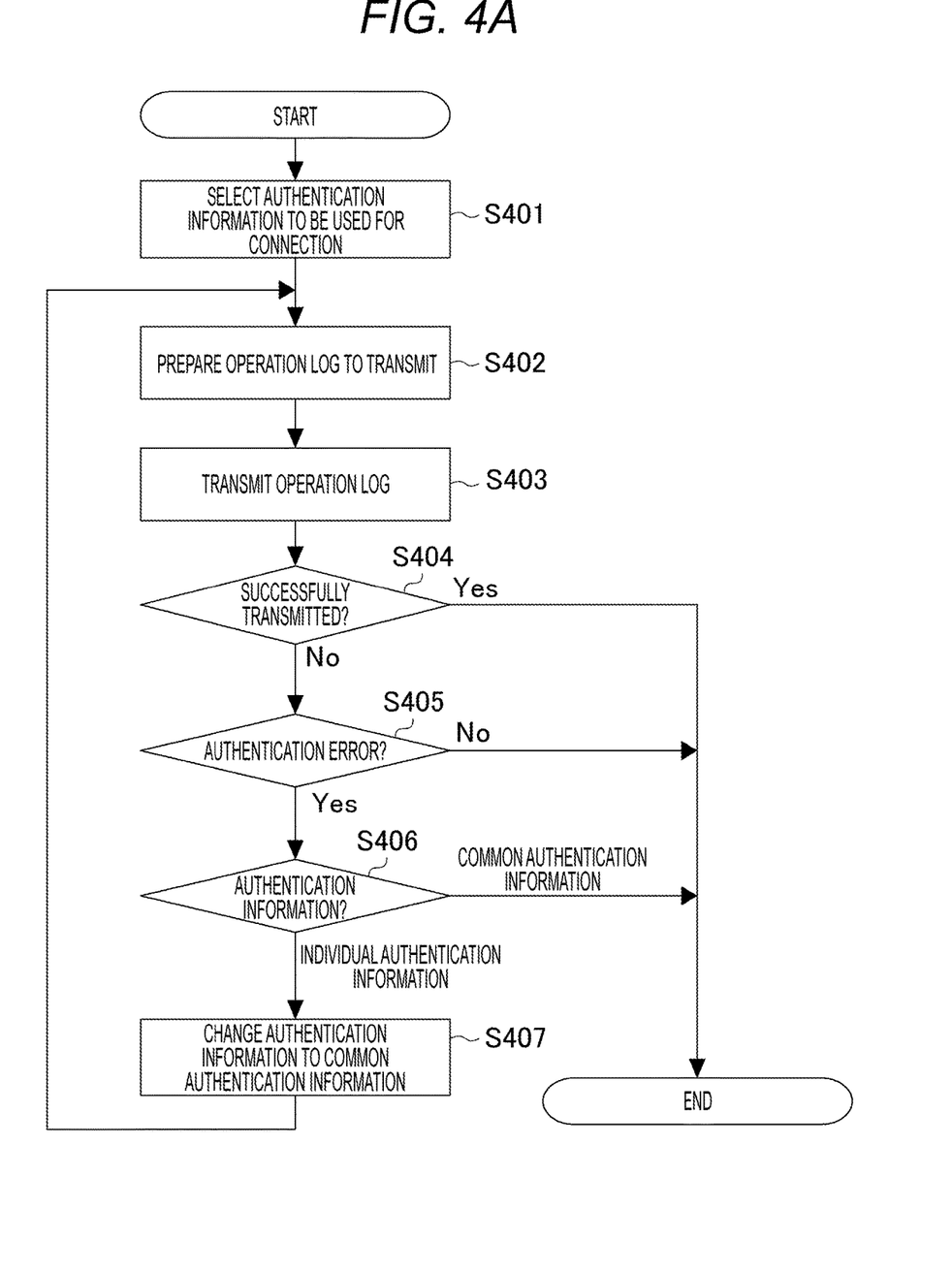
FIGS. 4A and 4B are flowcharts illustrating an example of information processing according to one or more aspects of the present disclosure.

FIG. 3A illustrates an example of a software configuration of the information collecting application that runs in the information collecting client 110. An authentication information storage unit 301 stores common authentication information 302 and individual authentication information 303. The common authentication information 302 is a common key (initial common key), which is also referred to as a default credential, and is used in common by default among a plurality of information collecting clients 110 to access the management server 120. The plurality of the information collecting clients 110 are provided with the same initial common key in advance to access the management server 120. The individual authentication information 303 is an authentication key (individual unique key), which is also referred to as a client credential, and authorizes the individual information collecting clients 110 to access the management server 120. In other words, the plurality of the information collecting clients 110 are each provided with a different individual unique key. The individual unique key is issued by the management server 120 in a registration process at a first connection to the management server 120. The management server 120 receives the initial common key from the information collecting client 110 and client-identification information that uniquely identifies the information collecting client 110, and then issues an individual unique key, which is unique to each information collecting client 110. Since the operating information of the information processing apparatus includes user information such as a usage trend of the information processing apparatus, the management server 120 needs to receive the operating information after authenticating the information collecting client 110 as the sender. Thus, in the transmission of the operating information, the connection to the management server 120 is established by using the issued individual unique key. An operation log management unit 304 registers a log related to the operation of the information collecting application and stores and manages the log as an operation log. In the registered operation log, in addition to the content and execution time information of each process of the information collecting application, level information that indicates a granularity or a type of the log is registered in chronological order. Table A shows an example of the operation log, which is stored and managed in the operation log management unit 304.

TABLE A

| DATE AND TIME | LEVEL | CONTENT |
|---|---|---|
| 2016 Jun. 1 09:45:00 | standard | Application is started. |
| 2016 Jun. 1 09:45:20 | detail | Application settings are loaded. |
| 2016 Jun. 1 09:45:25 | user info | Target device: DEV00001, 01:02:03:04:05:06. |
| 2016 Jun. 1 10:00:00 | standard | Get Device Log is started. |
| 2016 Jun. 1 10:00:40 | standard | Get Device Log is completed. |
| 2016 Jun. 1 10:00:45 | user info | Get Device Log: Log Count is 5555. |
| 2016 Jun. 1 10:01:00 | standard | Put Device Log is started. |
| 2016 Jun. 1 10:01:05 | detail | Put Device Log: URL is https://xxx.xxx.xxx/devicelog/ |
| 2016 Jun. 1 10:04:10 | standard | Put Device Log: Timeout error (code = E 11000). |

The level information is classified into "standard," "detail," and "user info" for example. In the "standard," basic information such as an error occurred in the information collecting application, and a start, an end, or an error of the operating information collecting process or a communication process with the management server 120 are classified. In the "detail," detailed information such as a progress of each process in the information collecting application, communication setting, and the like are classified and, in the "user info," information including customer environment information such as customer network environment information and management information of the collection-target information processing apparatus are classified. An authentication information selection unit 305 manages the common authentication information 302 and individual authentication information 303, and selects one of the common authentication information 302 and individual authentication information 303 as the authentication information used for connecting to the management server 120. The information collecting client 110 is made to always select the individual authentication information 303 for the transmission of the operating information as described above and, when the individual authentication information 303 is in an unavailable state due to a problem, the operating information transmission itself is not performed. An operation log transmission unit 306 transmits the operation log stored and managed in the operation log management unit 304 to the management server 120 by using the authentication information selected by the authentication information selection unit 305.

Figure 3B:
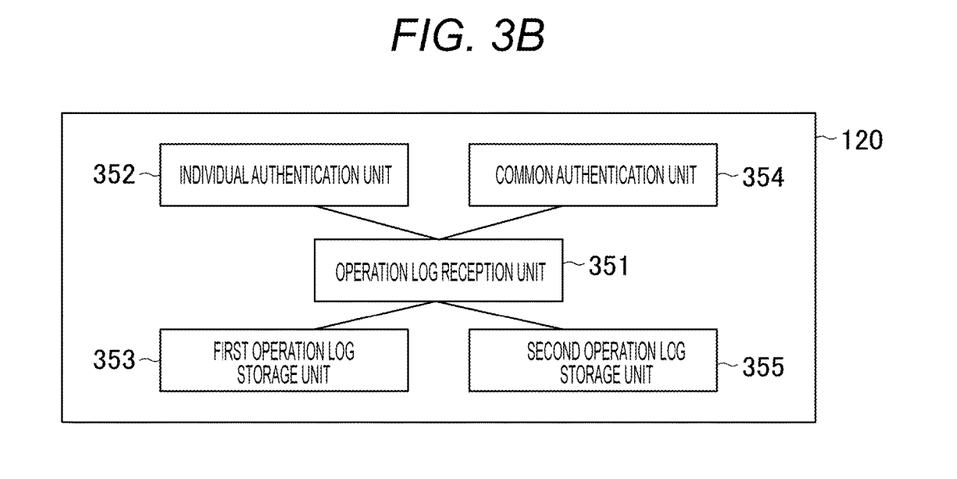
Figure 4B:
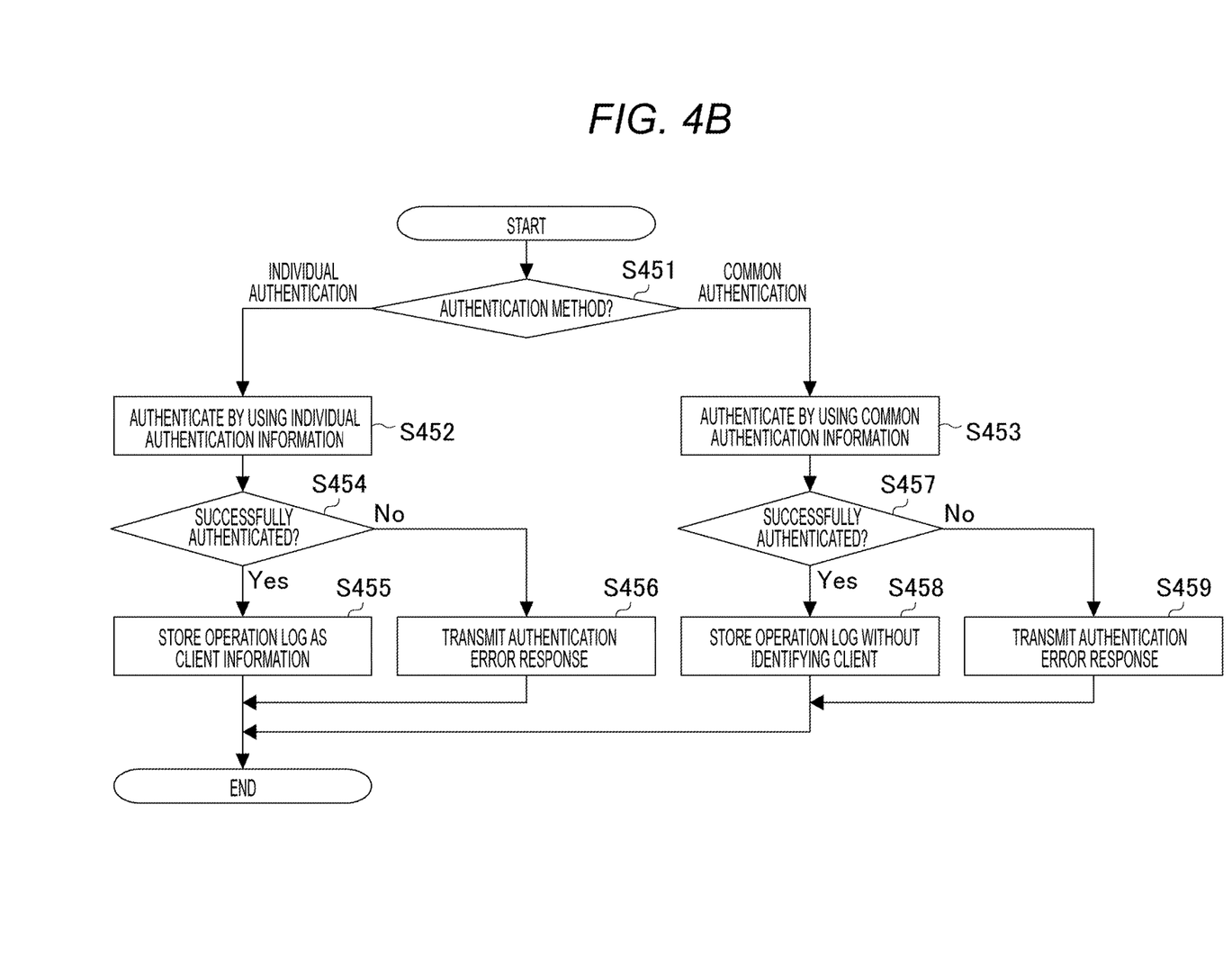

FIG. 3B is a diagram illustrating an example of a software configuration of the management application that runs in the management server 120. An operation log reception unit 351 receives the authentication information and operation log from the information collecting client 110. The individual authentication unit 352 manages the individual unique key issued for the information collecting client 110, and authenticates the information collecting client 110 based on the authentication information received by the operation log reception unit 351. Table B shows an example of a table of the individual unique keys managed by the individual authentication unit 352.

TABLE B

| IDENTIFICATION INFORMATION | INDIVIDUAL UNIQUE KEY | STATUS |
|---|---|---|
| CLIENT001 | cc-001 | Issued |
| CLIENT002 | cc-002 | Issued |
| CLIENT003 | cc-003 | Invalid |

In the individual unique key table, an individual unique key issued for the information collecting client 110 and a state of the individual unique key are registered for each client-identification information that uniquely identifies the information collecting client 110. In the example of Table B, the individual unique key corresponding to the client-identification information "CLIENT001" is "cc-001" and its status is "issued," which indicates that the individual unique key is available. The individual authentication unit 352 uniquely identifies the information collecting client 110 and confirms the validity of the identified information collecting client 110 by referring to the information in the individual unique key table and the authentication information received by the operation log reception unit 351. When the authentication of the information collecting client 110 is successful, a first operation log storage unit 353 stores the received operation log as an operation log of the information collecting client 110. For example, when the management server 120 collects and manages the operating information of the information processing apparatus of a plurality of customers, the first operation log storage unit 353 divides the information based on a tenant of each customer in view of information security and stores the received operating information of the information processing apparatus in a tenant area of each customer. Since the first operation log storage unit 353 divides the tenant area for each customer and properly manages an access right to the tenant areas, the stored customer data is protected. In the first operation log storage unit 353, the operation log of the information collecting client 110 is also stored in the tenant area of the customer to which the information collecting client 110 belongs. The common authentication unit 354 manages the initial common key which is commonly used by the plurality of information collecting clients 110 and authenticates the information collecting client 110 based on the authentication information received by the operation log reception unit 351. Since the initial common key is commonly used by the plurality of information collecting clients 110, the common authentication unit 354 cannot perform authentication as uniquely identifying the information collecting client 110, and confirms only the validity of the information collecting client 110. When the authentication of the information collecting client 110 is successful, a second operation log storage unit 355 stores the received operation log without identifying the client as the sender. Different from the first operation log storage unit 353, since the second operation log storage unit 355 does not identify the customer to which the client as a sender, the operation log is stored in a storage area different from the tenant area which is managed for each customer.

FIG. 4A is a flowchart illustrating an example of information processing in a case where the information collecting client 110 transmits an operation log to the management server 120 as a regularly executed task. The operation log transmission process by the information collecting client 110 starts at time specified in advance or at a timing instructed by the management server 120. In the following, according to the flowchart of FIG. 4A, the operation log transmission process by the information collecting client 110 will be described.

In S401, when a transmission of an operation log is instructed, the authentication information selection unit 305 selects authentication information which can be used to connect to the management server 120 from the authentication information stored in the authentication information storage unit 301. Here, when the individual authentication information 303 is available, the authentication information selection unit 305 selects the individual authentication information 303.

In S402, the operation log transmission unit 306 prepares an operation log, which is to be transmitted to the management server 120 from the operation log stored in the operation log management unit 304, based on the operation log transmission setting, which is set in advance, and the authentication information selected by the authentication information selection unit 305. More specifically, the operation log transmission unit 306 extracts operation logs from the operation logs subsequent to the operation logs which are already and successfully transmitted to the management server 120, in a case where it is set to transmit detailed logs. Further, the operation log transmission unit 306 extracts only operation logs which have a log level of "standard" when it is set to limit standard logs only. Further, when the authentication information selection unit 305 selects the common authentication information 302, the operation log transmission unit 306 extracts operation logs as eliminating operation logs of "user info" including the customer environment information. In other words, in the example of Table A, in a case that it is set to transmit detailed logs and the individual authentication information 303 is selected as the authentication information, the operation log transmission unit 306 extracts operation logs of "standard," "detail," and "user info." In a case that it is set to transmit detailed logs and the common authentication information 302 is selected as the authentication information, the operation log transmission unit 306 extracts the operation logs of "standard," and "detail." The reason why the operation logs to be extracted are changed according to the authentication information is that, in a case of the common authentication information 302, the management server 120 which has received the common authentication information 302 cannot perform an authentication that uniquely identify the information collecting client 110. Even when it is assured that the data is received from a legitimate information collecting client 110, it cannot be assured from which information collecting client 110 the data is received. The management server 120 cannot manage the received data by strictly dividing based on a unit of the information collecting client 110 or customers to which the information collecting client 110 belongs. Thus, the data to be transmitted by using the common authentication information 302 needs to be limited to information which does not include user information.

In S403, the operation log transmission unit 306 connects to the management server 120 by using the selected authentication information and transmits the prepared operation log.

In S404, the operation log transmission unit 306 determines whether the transmission of the operation log is successful. When the transmission of the operation logs is successful (Yes in S404), the operation log transmission unit 306 ends the process illustrated in FIG. 4A. When the transmission of the operation log is failed (No in S404), the process in the operation log transmission unit 306 proceeds to S405.

In S405, the operation log transmission unit 306 determines whether an authentication error response is received from the management server 120 based on the content of the error. When an authentication error response is received from the management server 120 (Yes in S405), the process in the operation log transmission unit 306 proceeds to S406. When an authentication error response is not received from the management server 120 (No in S405), the operation log transmission unit 306 ends the process illustrated in FIG. 4A.

In S406, the operation log transmission unit 306 determines whether the individual authentication information is used or the common authentication information is used as the authentication information. When the authentication error response received after transmission using the individual authentication information 303 (the individual authentication information in S406), the process in the operation log transmission unit 306 proceeds to S407. When the authentication error response is received after transmission using the common authentication information 302 (the common authentication information in S406), the operation log transmission unit 306 ends the process illustrated in FIG. 4A.

In S407, the authentication information selection unit 305 changes the authentication information to select from the individual authentication information 303 to the common authentication information 302. Then, the authentication information selection unit 305 again returns to the process in S402. Then, the operation log transmission unit 306 attempts to transmit the operation logs by using the changed authentication information. In this case, since the operation log transmitted by the operation log transmission unit 306 is extracted again in S402, a log that an authentication error has occurred when the operation log is transmitted using the individual authentication information is added to the operation log. Further, since the authentication information is changed, the operation log which does not include "user info" is extracted.

In S407, the authentication information selection unit 305 changes the authentication information to select from the individual authentication information 303 to the common authentication information 302. Then, the process in the authentication information selection unit 305 again returns to the process in S402. Then, the operation log transmission unit 306 attempts to transmit the operation log by using the changed authentication information. In this case, since the operation log transmitted by the operation log transmission unit 306 is again extracted in S402, a log that an authentication error has occurred when the operation log is transmitted by using the individual authentication information is added to the operation log. Further, since the authentication information is changed, the operation log which does not include "user info" is extracted.

FIG. 4B is a flowchart illustrating an example of image processing in a case where the management server 120 receives an operation log from the information collecting client 110. In the following, according to the flowchart of FIG. 4B, an operation log reception process by the management server 120 will be described.

In S451, when the operation log is received from the information collecting client 110, the operation log reception unit 351 confirms the authentication information transmitted from the information collecting client 110. The operation log reception unit 351 determines whether the authentication is performed by using the individual authentication unit 352 or the authentication is performed by using the common authentication unit 354 based on the authentication information. The operation log reception unit 351 determines to perform the authentication by using the individual authentication unit 352 when the authentication information is the individual authentication information, and determines to perform the authentication by using the common authentication unit 354 when the authentication information is the common authentication information. When the operation log reception unit 351 determines to perform the authentication by using the individual authentication unit 352, (individual authentication in S451), the process proceeds to S452 and, when the operation log reception unit 351 determines to perform the authentication by using the common authentication unit 354 (common authentication in S451), the process proceeds to S453. In S452, the individual authentication unit 352 performs authentication by using the individual authentication information.

In S454, the individual authentication unit 352 determines whether the authentication is successful. When the individual authentication unit 352 determines that the authentication is successful (Yes in S454), the process proceeds to S455 and, when the individual authentication unit 352 determines that the authentication is failed (No in S454), the process proceeds to S456.

When the authentication is successful by using the individual authentication unit 352, the information collecting client 110 which is the sender is uniquely identified and its validity is assured. Thus, in S455, the first operation log storage unit 353 stores the operation log as an operation log of the information collecting client 110 which is uniquely identified.

In S456, the operation log reception unit 351 transmits an authentication error response to the information collecting client 110 without storing the received operation log.

In S453, the common authentication unit 354 performs an authentication by using the common authentication information.

In S457, the common authentication unit 354 determines whether the authentication is successful. When the common authentication unit 354 determines that the authentication is successful (Yes in S457), the process proceeds to S458 and, when the common authentication unit 354 determines that the authentication is failed (No in S457), the process proceeds to S459.

When the authentication is successful by using the common authentication unit 354, the information collecting client 110 which is the sender is not identified and only the validity as an information collecting client 110 is assured. Thus, in S458, the second operation log storage unit 355 stores the received operation log without identifying the information collecting client 110.

When the authentication is successful by using the common authentication unit 354, the information collecting client 110 as the sender is not identified and only the validity as the information collecting client 110 is assured. Thus, in S458, the second operation log storage unit 355 stores the received operation log without identifying the information collecting client 110.

As described above, according to the process of the present embodiment, even in a case that the individual authentication information 303 used in the operation log transmission cannot be used, the operation log can be transmitted to the management server 120 by using the common authentication information 302. Since the operation log of the information collecting client 110 has been already transmitted to the management server 120, an operation condition of the information collecting application including the process that the individual authentication information 303 has become invalid can be confirmed in the management server 120.

Second Embodiment

Even in a case that the individual authentication information 303 becomes invalid during transmission of the operation log, the information collecting client 110 according to the first embodiment can transmit the operation log to the management server 120 by using the common authentication information 302. However, in a case where the individual authentication information 303 becomes invalid, although the operation log can be transmitted by using the common authentication information 302, the operating information of the information processing apparatus including the customer information cannot be transmitted. Even when the operating information is repeatedly transmitted from the information collecting client 110 to the management server 120 in such a condition, the authentication error response is repeatedly transmitted from the management server 120 unless the first registration process from the information collecting client 110 or the like is performed again.

In view of the above, according to the present embodiment, a process in which the communication from the information collecting client 110 is stopped when an authentication error response is transmitted from the management server 120. The system configuration according to the present embodiment is the same as that in FIG. 1 and the hardware configurations are the same as those in FIGS. 2A and 2B. The software configuration of the management server 120 is also the same as that in FIG. 3B.

Figure 5:
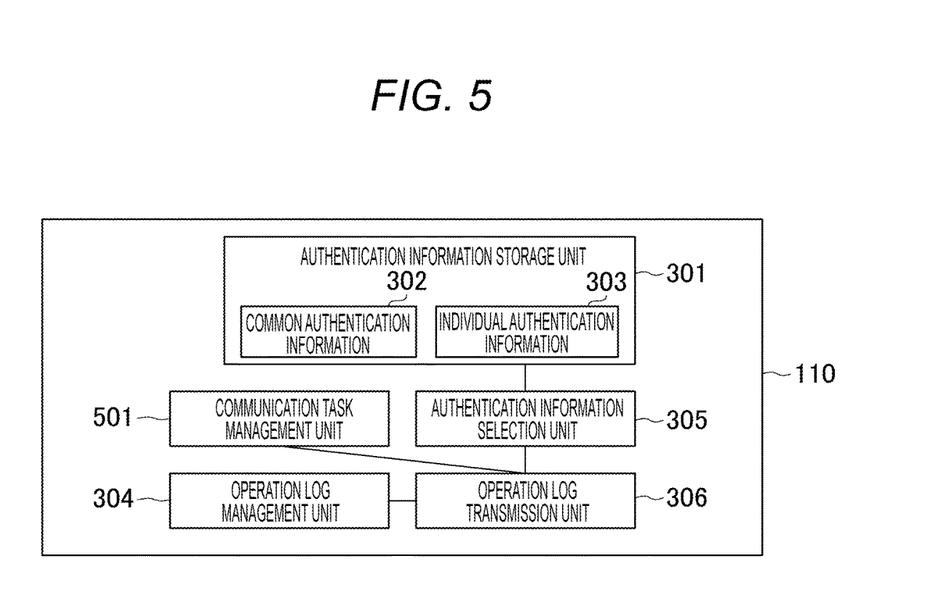
FIG. 5 is a diagram illustrating an example of a software configuration of an information collecting client according to one or more aspects of the present disclosure.
Figure 6:
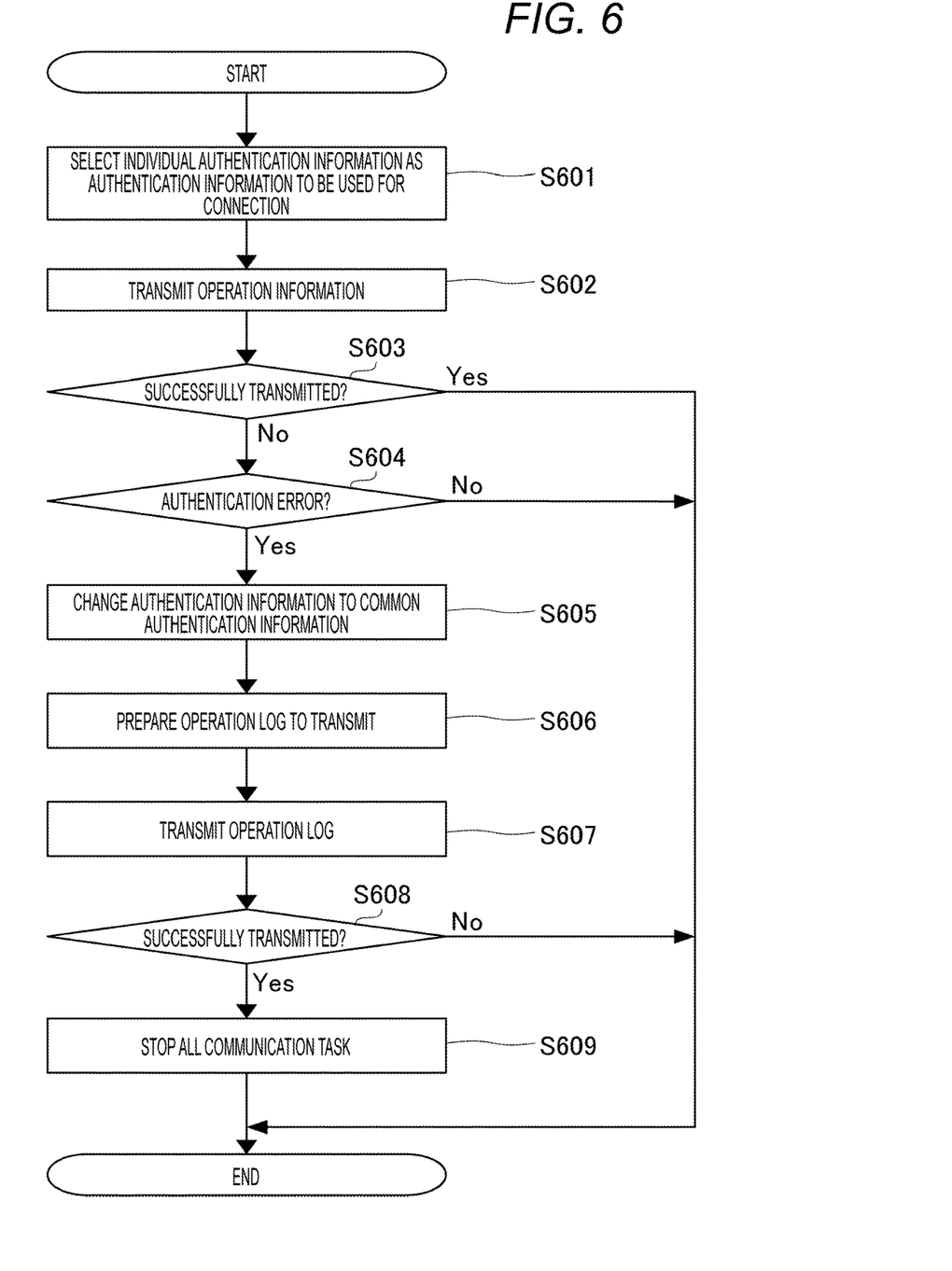
FIG. 6 is a flowchart illustrating an example of information processing according to one or more aspects of the present disclosure.

FIG. 5 is a diagram illustrating an example of a software configuration of the information collecting application that runs in the information collecting client 110. The common authentication information 302, individual authentication information 303, operation log management unit 304, authentication information selection unit 305, and operation log transmission unit 306 are the same as those in FIG. 3A, respectively. A communication task management unit 501 manages a task of a transmission, to the management server 120, of the operating information, operation log, and the like of the information processing apparatus. More specifically, the communication task management unit 501 registers a necessity of a transmission, transmission time, and frequency for each type of information to be transmitted, and calls and starts a transmission process of the operating information and operation log based on the registered information.

FIG. 6 is a flowchart illustrating an example of an operating information transmission process by the information collecting client 110 until the communication stops in response to transmission of an authentication error response from the management server 120 during the operating information transmission according to the present embodiment. In the following, according to the flowchart of FIG. 6, an operating information transmission process by the information collecting client 110 will be described.

In S601, the authentication information selection unit 305 selects the individual authentication information 303 as the authentication information used to connect to the management server 120.

In S602, the operation log transmission unit 306 transmits operating information.

In S603, the operation log transmission unit 306 determines whether the transmission of the operating information is successful. When the transmission of the operating information is successful (Yes in S603), the operation log transmission unit 306 ends the process illustrated in FIG. 6, and, when the transmission of the operating information is failed (No in S603), the process proceeds to S604.

In S604, the operation log transmission unit 306 determines whether an authentication error response is received from the management server 120 based on an error content. When an authentication error response is received from the management server 120 (Yes in S604), the process in the operation log transmission unit 306 proceeds to S605. When an authentication error response is not received from the management server 120 (No in S604), the operation log transmission unit 306 ends the process illustrated in FIG. 6.

Then, the operation log transmission unit 306 stops the transmission of the operating information, and attempts to transit an operation log by using changed authentication information.

In S606, as in S402 according to the first embodiment, the operation log transmission unit 306 prepares an operation log to be transmitted to the management server 120 by using the common authentication information 302, based on the operation log stored in the operation log management unit 304.

Then, in S607, the operation log transmission unit 306 connects to the management server 120 by using the selected authentication information (that is, the common authentication information 302) and transmits the prepared operation log.

In S609, the communication task management unit 501 deletes the transmission task to the management server 120 including the registered operating information, operation log, and the like and ends the process illustrated in FIG. 6. Here, since the transmission task managed by the communication task management unit 501 is deleted, the information collecting client 110 stops following communication with the management server 120.

As described above, according to the present embodiment, in a case where an authentication error response is transmitted from the management server 120, an operation log is transmitted after changing the authentication information and the communication with the management server 120 is stopped. Even when the individual authentication information 303 becomes invalid during transmission of operating information of the information processing apparatus, an operation log can be transmitted to the management server 120 by using the common authentication information 302. Since the operation log of the information collecting client 110 is transmitted to the management server 120, the management server 120 can recognize the operation condition of the information collecting application before the communication with the management server 120 is stopped.

Third Embodiment

According to the first embodiment, the information collecting client 110 prepares an operation log to be transmitted to the management server 120 according to operation log transmission setting, which is set in advance, and transmits the operation log to the management server 120. The operation log is information required by the management server 120 to confirm a condition when a problem occurs in the operation condition of the information collecting application. Thus, the management server 120 can instruct the log level that indicates if a detailed log is required or the operation log transmission setting such as transmission time information.

In view of this, according to the present embodiment, a case will be described that the management server 120 manages the operation log transmission setting, and the information collecting client 110 obtains the operation log transmission setting from the management server 120 and transmits the operation log. The system configuration according to the present embodiment is the same as that of FIG. 1 and the hardware configurations are the same as those in FIGS. 2A and 2B.

Figure 7A:
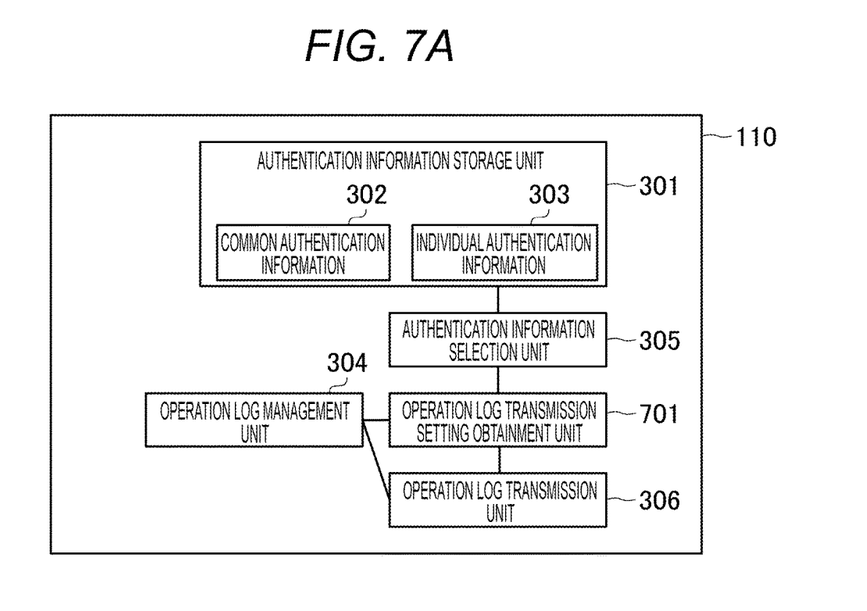
FIGS. 7A and 7B are diagrams illustrating an example of software configurations of each device according to one or more aspects of the present disclosure.
Figure 8:
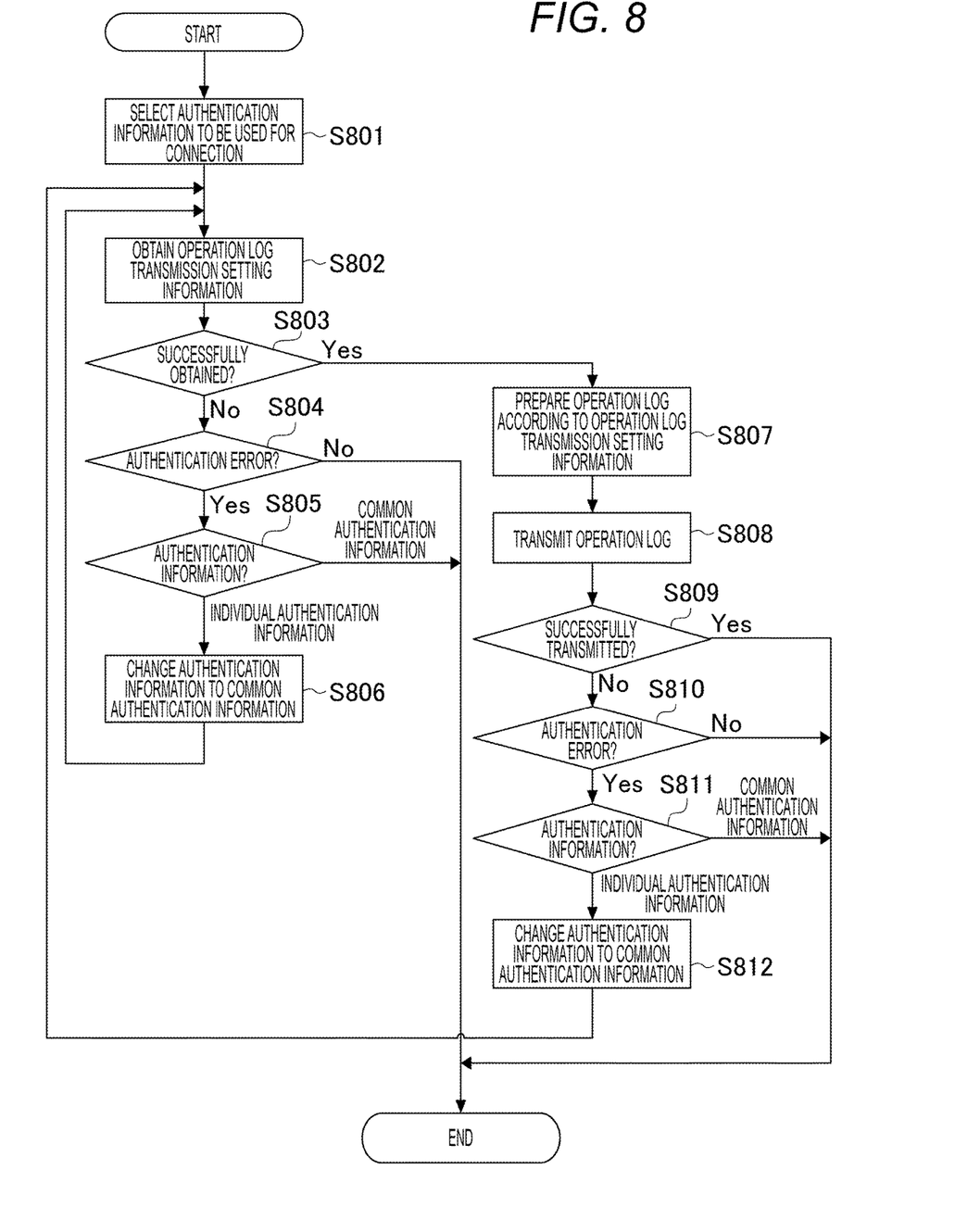
FIG. 8 is a flowchart illustrating an example of information processing according to one or more aspects of the present disclosure.

FIG. 7A is a diagram illustrating an example of a software configuration of the information collecting application that runs in the information collecting client 110. The common authentication information 302, individual authentication information 303, operation log management unit 304, authentication information selection unit 305, and operation log transmission unit 306 are the same as those in FIG. 3A, respectively. An operation log transmission setting obtainment unit 701 obtains operation log transmission setting managed by the management server 120 from the management server 120 by using authentication information selected by the authentication information selection unit 305.

Figure 7B:
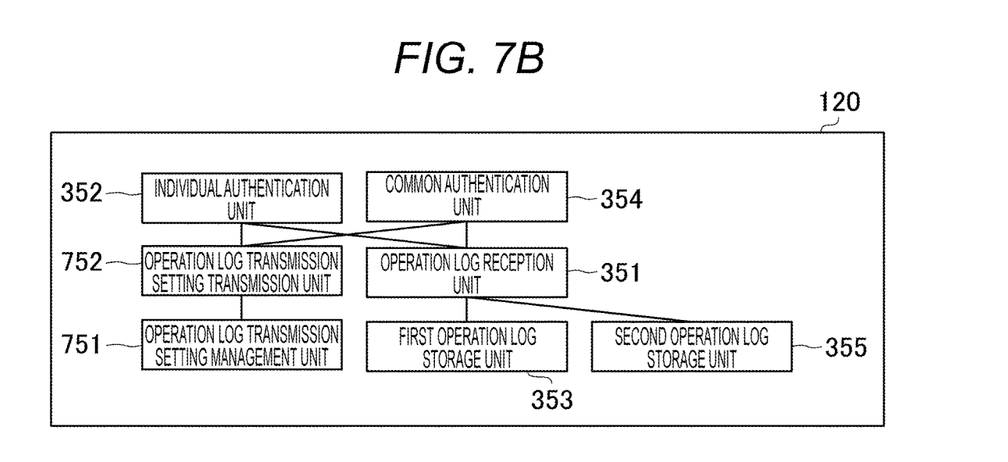

FIG. 7B is a diagram illustrating an example of the software configuration of the management application that runs in the management server 120. The operation log reception unit 351, individual authentication unit 352, first operation log storage unit 353, common authentication unit 354, and second operation log storage unit 355 are the same as those in FIG. 3B, respectively. An operation log transmission setting management unit 751 manages the operation log transmission setting set for each information collecting client 110. Further, the operation log transmission setting management unit 751 also stores operation log transmission setting used in common between a plurality of information collecting clients 110 in a case where authentication is performed by the common authentication unit 354. Table C illustrates an example of a table of operation log transmission setting managed by the operation log transmission setting management unit 751.

TABLE C

| IDENTIFICATION INFORMATION | LOG LEVEL | TRANSMISSION TIME INFORMATION |
|---|---|---|
| (When performing common authentication) | Detail | N/A |
| CLIENT001 | Standard | 10:00 |
| CLIENT002 | Detail | 11:00 |
| CLIENT003 | Standard | 12:00 |

In the operation log transmission setting table, a log level that indicates whether a detailed log is needed and operation log transmission setting such as transmission time information is registered and managed for each client-identification information that uniquely identifies the information collecting client 110. In the example of Table C, the log level set in the client-identification information "CLIENT001" is "standard" and the transmission time information is "10:00." Further, the operation log transmission setting table stores a log level of "detail" and transmission time information of "N/A" as operation log transmission setting commonly used between the plurality of information collecting clients 110 when authentication is performed by the common authentication unit 354. An operation log transmission setting transmission unit 752 transmits corresponding setting information from the operation log transmission setting table to the information collecting client 110 according to the authentication information used for the authentication and information of the identified information collecting client 110. More specifically, when the authentication is performed by using the individual authentication unit 352, since the information collecting client 110 is uniquely identified, the operation log transmission setting transmission unit 752 transmits setting information of the operation log corresponding to the identified client-identification information. In a case that the authentication is performed by using the common authentication unit 354, the operation log transmission setting transmission unit 752 transmits operation log transmission setting for the common authentication timing, which is commonly used by the plurality of information collecting clients 110.

FIG. 8 is a flowchart illustrating an example of information processing in a case that the information collecting client 110 transmits an operation log to the management server 120 after obtaining operation log transmission setting. At the timing when an instruction is given from the management server 120, an operation log transmission process by the information collecting client 110 starts. In the following, according to the flowchart of FIG. 8, the operation log transmission process by the information collecting client 110 will be described.

In S801, when transmission of an operation log is instructed, the authentication information selection unit 305 selects authentication information which can be used for connecting to the management server 120 from the authentication information stored in the authentication information storage unit 301. Here, the authentication information selection unit 305 selects the individual authentication information 303 when the individual authentication information 303 can be used.

Then, in S802, the operation log transmission setting obtainment unit 701 connects to the management server 120 by using the selected authentication information and obtains operation log transmission setting information.

In S803, the operation log transmission setting obtainment unit 701 determines whether the operation log transmission setting information is successfully obtained. When the operation log transmission setting obtainment unit 701 determines that the operation log transmission setting information is successfully obtained (Yes n S803), the process proceeds to S807 and, when the operation log transmission setting obtainment unit 701 determines that the operation log transmission setting information is failed to obtain (No in S803), the process proceeds to S804.

In S804, the operation log transmission setting obtainment unit 701 confirms an error content and determines whether an authentication error response is received from the management server 120. When an authentication error response is received from the management server 120 (Yes in S804), the process in the operation log transmission setting obtainment unit 701 proceeds to S805. When an authentication error response is not received from the management server 120 (No in S804), the operation log transmission setting obtainment unit 701 ends the process of the flowchart illustrated in FIG. 8.

In S805, the operation log transmission setting obtainment unit 701 determines whether individual authentication information is used or common authentication information is used as the authentication information. When the transmission is performed by using the individual authentication information 303 and an authentication error response is received (individual authentication information in S805), the process in the operation log transmission setting obtainment unit 701 proceeds to S806. When the transmission is performed by using the common authentication information 302 and an authentication error response is received (common authentication information in S805), the operation log transmission setting obtainment unit 701 ends the process illustrated in FIG. 8.

In S806, the authentication information selection unit 305 determines that the individual authentication information 303 cannot be used, and changes the selected authentication information from the individual authentication information 303 to the common authentication information 302. Then, the process in the authentication information selection unit 305 again returns to S802. In S802, the operation log transmission setting obtainment unit 701 attempts to obtain operation log transmission setting information by using the changed authentication information.

In S807, the operation log transmission unit 306 prepares an operation log to transmit to the management server 120, from the operation log stored in the operation log management unit 304, according to the obtained operation log transmission setting information and authentication information.

Then, in S808, the operation log transmission unit 306 connects to the management server 120 by using the selected authentication information and transmits the prepared operation log.

In S809, the operation log transmission unit 306 determines whether the operation log is successfully transmitted. When the operation log is successfully transmitted (Yes in S809), the operation log transmission unit 306 ends the process illustrated in FIG. 8. When the transmission of the operation log is failed (No in S809), the process in the operation log transmission unit 306 proceeds to S810.

In S810, the operation log transmission unit 306 determines whether an authentication error response is received from the management server 120 based on an error content. When an authentication error response is received from the management server 120 (Yes in S810), the process in the operation log transmission unit 306 proceeds to S811. When an authentication error response is not received from the management server 120 (No in S810), the operation log transmission unit 306 ends the process illustrated in FIG. 8. Since the operation log transmission setting information is successfully obtained in S803, it is not generally determined as an authentication error in S810. However, the information collecting client 110 executes a determination process as in the processes from S804 to S806 to handle a case that there is a change in the condition of the authentication information after the operation log transmission setting information is obtained in S802.

In other words, in S811, the operation log transmission unit 306 determines whether the individual authentication information is used or the common authentication information is used as the authentication information. In a case where the transmission is performed by using the individual authentication information 303 and an authentication error response is received (individual authentication information in S811), the process in the operation log transmission unit 306 proceeds to S812. In a case where the transmission is performed by using the common authentication information 302 and an authentication error response is received (common authentication information in S811), the operation log transmission unit 306 ends the process illustrated in FIG. 8.

In S812, the authentication information selection unit 305 changes the authentication information to select from the individual authentication information 303 to the common authentication information 302. Then, the authentication information selection unit 305 again returns the process in S802. In S802, the operation log transmission setting obtainment unit 701 attempts to obtain the operation log transmission setting information by using the changed authentication information. Here, the reason that the operation log transmission setting information is obtained again in S802 even though the operation log transmission setting information is already obtained is because the transmission setting information to be obtained is changed due to the change of the authentication information to be used.

As described above, according to the processes of the present embodiment, even when the individual authentication information 303 becomes invalid, the operation log transmission setting information is obtained from the management server 120 by using the common authentication information 302 and the operation log can be transmitted to the management server 120. Since the operation log of the information collecting client 110 has been already transmitted to the management server 120, the management server 120 can confirm the operation condition of the information collecting application including the process that the individual authentication information 303 becomes invalid.

Other Embodiments

As described above, according to the process of the above described embodiments, even when the communication becomes unavailable during the transmission of the operation log by using the individual authentication information, an operation log can be transmitted to the management server by using the common authentication information that uses a common key which is commonly used by the plurality of information collecting clients. Since an operation log of the information collecting client is already transmitted to the management server, the management server can confirm the operation condition of the information collecting application including the process that the communication by using the individual authentication information becomes unavailable.

Further, the above embodiment may be optionally combined and executed.

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-001045, filed Jan. 6, 2017, which is hereby incorporated by reference herein in its entirety.

What is claimed is:

1. A client device comprising:
   at least one memory storing instructions; and
   at least one processor which executes the instructions to cause the client device to function as:
   a first transmission unit configured to transmit first operation information to a server device by using individual authentication information, which is authentication information of each client device;
   a first change unit configured to change the authentication information from the individual authentication information to common authentication information, which is authentication information commonly used by each client device, in a case where the transmission of the first operation information is failed due to an authentication error; and
   a second transmission unit configured to transmit second operation information to the server device by using the common authentication information, which is changed by the first change unit
   a first obtainment unit configured to obtain transmission setting information from the server device by using the individual authentication information; and
   a second obtainment unit configured to obtain the first operation information according to the transmission setting information obtained by the first obtainment unit, wherein the first transmission unit transmits, to the server device, the first operation information obtained by the second obtainment unit, by using the individual authentication information.

2. The client device according to claim 1, further comprising:
a determination unit configured to determine whether the transmission of the first operation information is failed due to an authentication error,
wherein the first change unit changes the authentication information from the individual authentication information to the common authentication information in a case where the determination unit determines that the transmission of the first operation information is failed due to an authentication error.

3. The client device according to claim 1, further comprising:
a stop unit configured to stop communication with the server device after transmitting the second operation information to the server device by using the second transmission unit.

4. The client device according to claim 1, further comprising:
a second change unit configured to change the authentication information from the individual authentication information to the common authentication information in a case where the obtainment of the transmission setting information is failed due to an authentication error; and
a third obtainment unit configured to obtain the transmission setting information from the server device by using the common authentication information.

5. The client device according to claim 1,
wherein the first operation information is an operation log which includes customer information, and
the second operation information is an operation log which does not include the customer information.

6. The client device according to claim 1,
wherein the first operation information is operating information which includes customer information, and
the second operation information is an operation log which does not include the customer information.

7. The client device according to claim 1, wherein the client device is an image forming apparatus.

8. An information processing method executed by a system including a server device and a client device, the information processing method comprising:
transmitting, by the client device, first operation information to the server device by using individual authentication information, which is authentication information of each client device;
changing the authentication information from the individual authentication information to common authentication information, which is authentication information commonly used by each client device, in a case where the client device failed to transmit the first operation information due to an authentication error;
transmitting, by the client device, second operation information to the server device by using the common authentication information changed in the changing;
determining, by the server device, authentication information of the client device;
identifying a client device which has transmitted the first operation information and storing the first operation information, by the server device, in a case where the authentication information is determined to be the individual authentication information in the determining; and
storing the second operation information without identifying the client device which has transmitted the second operation information, by the server device, in a case where the authentication information is determined to be the common authentication information in the determining.

9. A non-transitory computer-readable storage medium storing executable instructions for causing a system including a server and a client device to execute an information processing method comprising:
transmitting, by the client device, first operation information to a server device by using individual authentication information, which is authentication information for each client device;
changing the authentication information from the individual authentication information to common authentication information, which is authentication information commonly used by each client device, in a case where the transmission of the first operation information is failed due to an authentication error; and
transmitting, by the client device, second operation information to the server device by using the common authentication information changed in the changing
determining, by the server device, authentication information of the client device;
identifying a client device which has transmitted the first operation information and storing the first operation information, by the server device, in a case where the authentication information is determined to be the individual authentication information in the determining; and
storing the second operation information without identifying the client device which has transmitted the second operation information, by the server device, in a case where the authentication information is determined to be the common authentication information in the determining.

* * * * *